United States Patent [19]

Hirota

[11] 3,772,509
[45] Nov. 13, 1973

[54] LIGHTING DEVICE
[75] Inventor: Kashichi Hirota, Tokyo, Japan
[73] Assignee: Kyowa Denki Kagaku Kabushiki Kaisha, Tokyo, Japan
[22] Filed: Dec. 13, 1971
[21] Appl. No.: 207,006

[30] Foreign Application Priority Data
Dec. 30, 1970  Japan .............................. 45/129364

[52] U.S. Cl. .......... 240/2.1, 240/8.16, 240/41.35 A, 240/41.35 E, 116/124.4
[51] Int. Cl. .......................................... G01d 11/28
[58] Field of Search .................. 116/124.1, 124.4, 116/116, 135; 240/41.35, 41.35 A, 41.35 B, 41.35 E, 2.1, 7.1 C, 8.16, 8.2, 8.22, 8.24, 41.5

[56] References Cited
UNITED STATES PATENTS
1,467,636   9/1923   Hammond .................. 240/8.16
2,562,498   7/1951   Leboffe ....................... 240/8.16
1,668,515   5/1928   Lewellen ..................... 240/8.16
1,302,924   5/1919   Hollnagel et al. ........... 240/41.35 E
1,510,026   9/1924   Adler .......................... 250/41.5 X
2,804,541   8/1957   Schotz ........................ 240/41.5 X
1,950,330   3/1934   Thrall ......................... 240/41.35 A Primary Examiner—Richard M. Sheer
Attorney—John Lezdey et al.

[57] ABSTRACT

A lighting device for elongate transparent scale plates, wherein a mirror is made up of a parabolic curved wall and flat walls attached to the upper and lower sides of said parabolic curved wall each at an angle thereto, and a light source is mounted on said parabolic curved wall, whereby the elongate transparent scale plate is uniformly lighted.

1 Claim, 5 Drawing Figures

PATENTED NOV 13 1973 3,772,509

INVENTOR
KASHICHI HIROTA
BY John Begley
ATTORNEY

LIGHTING DEVICE

BACKGROUND OF THE INVENTION

1. Field of the Invention

This invention relates to a lighting device and more particularly to a lighting device for elongate transparent scale plates such, for example, as frequency calibration scales of radio receivers.

2. Description of the Prior Art

Most of the frequency calibration scales provided on the cabinets of radio receivers are of the type consisting usually of an elongate transparent plate with scale marks engraved therein and adapted to be lighted by a light permeating therethrough. Some of the lighting devices heretofore used for lighting such scales comprise two or more miniature electric bulbs located behind the elongate transparent scale plate mounted over a slot formed in a panel and a curved mirror disposed behind said electric bulbs. However, such lighting devices have the disadvantage that the scale plate is not uniformly lighted and the beams of light emanating upwardly and downwardly from the electric bulbs dissipate without lighting the scale plate, so that the loss of light is great and hence the scale plate is not lighted sufficiently.

Some other lighting devices comprise miniature electric bulbs respectively disposed adjacent the side faces of a transparent scale plate which has a relatively large thickness and is mounted on a panel, whereby the scale plate is lighted by the light of said electric bulbs penetrating thereinto from the side faces thereof. In such lighting devices, the luminous intensity of the light substantially decreased during passage of the light through the scale plate and the beams of light emanating upwardly, downwardly, leftwardly, rightwardly and backwardly from the electric bulbs are all dissipated, the beams of light emanating forwardly only being utilized for the lighting purpose, so that the lighting efficiency of the device is very low and the scale plate is not lighted brightly. In addition, since the lights of the miniature electric bulbs disposed on both sides of the scale plate are directly visible through the scale plate mounting slot formed in the panel, the appearance of the scale plate is spoiled.

SUMMARY OF THE INVENTION

According to the lighting device of the present invention, every portion of an elongate transparent scale plate can be uniformly lighted from the backside thereof and all of the beams of light emanating in all directions from a miniature electric bulb is reflected to effectively light the scale plate. Therefore, the scale plate is lighted very brightly, and the number of the miniature electric bulbs required can be reduced to half of that required in the conventional lighting devices and hence the power consumption is reduced, providing for the use of a small capacity transformer.

Furthermore, by coupling a plastic elongate scale plate with a plastic elongate mirror by means of a bolt extending through a slot formed in a panel, the bulging of the scale plate at the central portion thereof due to thermal expansion of said scale plate can be avoided because, even when the scale plate is subjected to thermal expansion or contraction, the mirror is expanded or contracted to the same degree as said scale plate.

The present invention consists in a lighting device of the type comprising miniature electric bulbs for lighting elongate transparent scale plates, such as the frequency calibration scales of radio receivers, by the beams of light emanating from said bulbs, which is capable of lighting uniformly every portion of the scale plate with a minimum number of electric bulbs. Namely, according to the present invention there is provided a lighting device comprising mirror means consisting of a plastic body open at the front and having an elongated vertical back wall of a parabolic shape in cross section and upper and lower flat walls extending forwardly and outwardly relative to each other, and having the inner surface thereof plated with a glossy plating; and a miniature electric bulb provided on said back wall, for mounting on a panel formed with a slot therein and having the opposite side of said mirror means mounted at locations adjacent the opposite ends of said slot, and a transparent scale plate mounted over the front face of said slot.

DESCRIPTION OF THE PREFERRED EMBODIMENT

Figure 1:
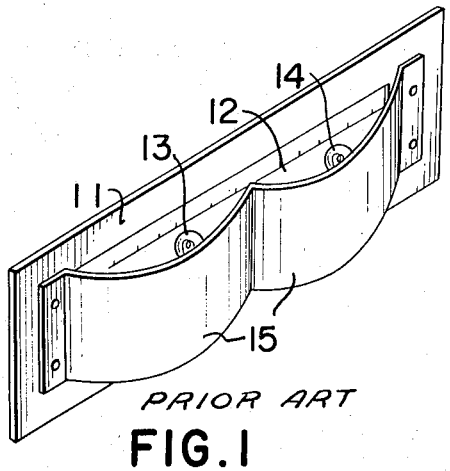
FIG. 1 is a perspective view of a conventional lighting device.

Referring to FIG. 1 there is shown one type of conventional lighting device. In this lighting device, two miniature electric bulbs 13, 14 are disposed behind an elongate transparent scale plate 12 mounted in a slot formed in a panel 11, and further a curved plate-like mirror 15 is disposed behind said bulbs. With such a lighting device, the scale plate 12 is not uniformly lighted and the beams of light emanating upwardly and downwardly from the bulbs 13, 14 dissipate without lighting the scale plate 12 at all. Therefore, the loss of light is great and the scale plate 12 is dark.

Figure 2:
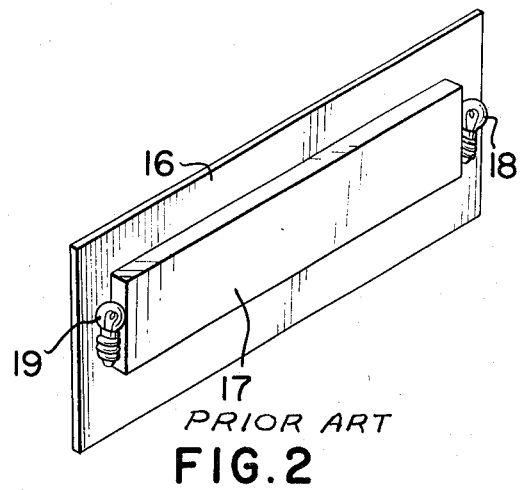
FIG. 2 is a perspective view of another type of conventional lighting device.

In another type of conventional lighting device shown in FIG. 2, miniature electric bulbs 18, 19 are provided each adjacent each side face of a relatively thick transparent scale plate 17 mounted on a panel 16. The beams of light emanating from the bulbs 18, 19 penetrate into the scale plate 17 from the opposite side faces thereof, thereby lighting said scale plate. However, the luminous intensity of the light substantially decreases during passage of the light through the scale plate 17 and moreover the beams of light emanating upwardly, downwardly, leftwardly, rightwardly and backwardly from the bulbs 18, 19 all dissipate wastefully and the beams of light emanating forwardly only are utilized for lighting. Therefore, the lighting efficiency is very poor and the scale plate 17 is dark. In addition, since the lights of the bulbs 18, 19 are visible directly through the slot formed in the panel 16, the appearance of the scale plate is spoiled.

Figure 3:
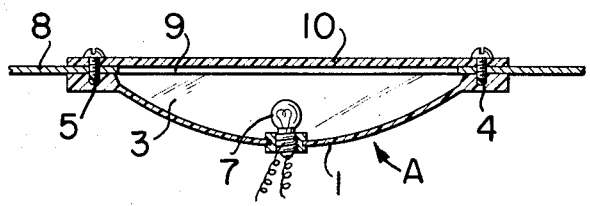
FIG. 3 is a lateral cross-sectional view of the lighting device according to the present invention.
Figure 4:
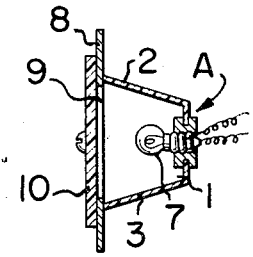
FIG. 4 is a vertical cross-sectional view of the lighting device of the invention.
Figure 5:
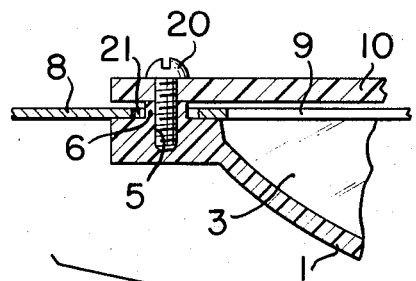
FIG. 5 is an enlarged cross-sectional view showing the mounting portions of the lighting device of the invention.
Figure 5:
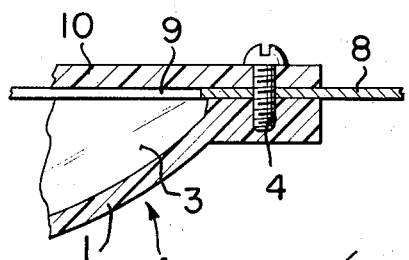

Now, the lighting device of the present invention will be described with reference to FIGS. 3 to 5. According to the invention, a mirror A open at the forward end and having a vertical back wall 1 curved toward the opposite side edges to form a parabolic surface, and an upper wall 2 and a lower wall 3 extending forwardly and outwardly relative to each other, and further having mounting holes 4, 5 formed in the opposite side edge portions thereof, is made of a plastic material, and a metal is deposited on the inner surface of said mirror to form a reflecting surface. A miniature electric bulb 7 is mounted at the center of the back wall 1.

The mirror A constructed as described above is mounted on the backside of a panel 8 in a manner to cover a slot 9 which is formed in said panel and has transparent scale plate 10 mounted thereover from the front side of the panel. The scale plate may be made of a semi-transparent material.

The beams of light emitted forwardly from the bulb 7 directly light the scale plate 10. The beams of light emitted backwardly reflect on the parabolic surface of the back wall 1 and light the scale plate 10. The beams of light emitted upwardly and downwardly reflect on the upper wall 2 and the lower wall 3 respectively, and parts thereof light the scale plate 10, while the other parts thereof again reflect on the lower wall 3 and the upper wall 2 respectively. Since the upper wall 2 and the lower wall 3 extend forwardly and outwardly relative to each other, the beams of light while repeately reflecting on said walls 2, 3, move gradually forwardly and finally impinge upon the scale plate 10 to light the same.

As described above, the beams of light emanating from the bulb 7 other than those directly lighting the scale plate 10 reach the scale plate 10 upon repeatedly reflecting on the back wall 1, the upper wall 2 and the lower wall 3, and finally, all the beams of light emanating from the bulb 7 light the scale plate 10 and the scale plate 10 is lighted very brightly.

Where the scale plate is mounted on the panel there is an elongate plastic plate, which expands longitudinally when heated by the heat generated from a transformer, resistor, a pilot lamp, etc. and as a result is subjected to bending with the central portion thereof bulging, since the scale plate is fixed at the opposite end.

In order to eliminate such undesirable phenomenon, a mounting flange on one side of the mirror A is formed with a projection 6 which extends forwardly outwardly through a mounting hole 21 formed in the panel 8 and contacts the scale plate 10. The mounting hole 21 has a space larger than the space occupied by the projection 6. The mirror and the scale plate are secured to each other by means of a screw 20, but, as seen, the panel is not secured to either one of them.

The scale plate 10 and the mirror A which are made of plastic materials have substantially the same coefficient of expansion and coefficient of contraction. In addition, the projection 6 at which one side of the mirror A is coupled with the scale plate 10 by means of the screw 20, is loosely received in the mounting hole 21. Therefore, the scale plate 10 and the mirror A expand or contract integrally with each other and the bending of the scale plate 10 due to thermal expansion can be avoided.

I claim:

1. A uniformly illuminated scale plate device adapted to be mounted on a panel having an elongated slot therein and holes therethrough adjacent the ends of the slot, comprising a plastic mirror means having an elongated rear wall with a parabolic longitudinal cross section terminating, when mounted, adjacent the ends of the slot in the panel and upper and lower substantially flat walls extending from the upper and lower edges of the rear wall upwardly and toward the longitudinal sides of the slot in the panel, an elongated non-opaque, plastic scale plate marginally larger than the slot in the panel, means for securing the ends of said plastic mirror means to the ends of said elongated plastic scale plate through the holes in the panel, said securing means being smaller than at least one of the holes through the panel adjacent the ends of the slot to permit, when heated, thermal expansion of said plastic mirror means and said plastic scale plate to prevent bending or buckling, the marginal edges around the slot in the panel being, when mounted, disposed between said mirror means and said scale plate, and a source of illumination mounted on said mirror means.

* * * * *